US009829844B2

(12) United States Patent
Itoh

(10) Patent No.: US 9,829,844 B2
(45) Date of Patent: Nov. 28, 2017

(54) IMAGE FORMING APPARATUS CONFIGURED TO DETERMINE WHETHER IMAGE DATA INCLUDES PIXEL HAVING A VALUE LARGER THAN A PREDETERMINED VALUE

(71) Applicant: CANON KABUSHIKI KAISHA, Tokyo (JP)

(72) Inventor: Jun Itoh, Kashiwa-shi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 7 days.

(21) Appl. No.: 14/963,548

(22) Filed: Dec. 9, 2015

(65) Prior Publication Data

US 2016/0170359 A1 Jun. 16, 2016

(30) Foreign Application Priority Data

Dec. 12, 2014 (JP) ................................ 2014-252060

(51) Int. Cl.
*H04N 1/46* (2006.01)
*G03G 15/00* (2006.01)

(52) U.S. Cl.
CPC ................................ *G03G 15/556* (2013.01)

(58) Field of Classification Search
None
See application file for complete search history.

(56) References Cited

U.S. PATENT DOCUMENTS

2006/0007509 A1* 1/2006 Imagawa ............ G03G 15/553
358/504
2016/0291499 A1* 10/2016 Shibuya ............ G03G 15/0275

FOREIGN PATENT DOCUMENTS

JP 2005250387 A 9/2005

* cited by examiner

*Primary Examiner* — Barbara Reinier
(74) *Attorney, Agent, or Firm* — Rossi, Kimms & McDowell LLP

(57) ABSTRACT

An image forming apparatus having a hardware configuration for counting the amount of toner used for an image to be printed for each color component uses a conversion coefficient used for processing for converting a pixel value in image data expressing the image into a signal value indicating the amount of toner to convert the pixel value into the signal value. The image forming apparatus outputs information indicating whether or not a high-density image portion is included in an image based on the signal value obtained by performing the conversion.

13 Claims, 10 Drawing Sheets

IMAGE FORMING APPARATUS CONFIGURED TO DETERMINE WHETHER IMAGE DATA INCLUDES PIXEL HAVING A VALUE LARGER THAN A PREDETERMINED VALUE

BACKGROUND OF THE INVENTION

Field of the Invention

The present invention relates to an image forming apparatus using an electrophotographic system such as a copying machine, a printer, or a multifunction peripheral (MFP).

Description of the Related Art

An image forming apparatus using an electrophotographic system, an electrostatic recording system, or the like charges the surface of an image carrier such as a photosensitive drum to a predetermined potential. An electrostatic latent image is formed on the charged surface of the image carrier, and this electrostatic latent image is developed to form a toner image on the surface of the image carrier. The toner image formed in this manner is transferred by a transfer unit such as a transfer roller from the surface of the image carrier to a printing material (an output sheet) or an intermediate transfer body. As the image forming apparatus, there is conventionally known a so-called tandem structure in which a plurality of the image carriers corresponding to respective toner colors are arranged in a direction in which the printing material or the intermediate transfer body is conveyed.

In the image forming apparatus in which the plurality of image carriers are arranged, there is a case that the development contrast of a toner image transferred by a succeeding image carrier differs between a portion of the printing material (or the intermediate transfer body) to which a toner image is transferred by a preceding image carrier and a portion of the printing material (or the intermediate transfer body) to which a toner image is not transferred by the preceding image carrier. As a result, there may occur a phenomenon called "a transfer memory" in which density unevenness appears in one image. This "transfer memory" will be described in detail.

For example, in an image forming process using negative toner (negatively charged toner) and employing a reverse developing method, a charging unit (a charging roller) uniformly charges the surface of a photosensitive drum to a dark part potential VD. Then an exposing unit emits image exposure light to the photosensitive drum according to an image density to change the potential of part of the surface of the photosensitive drum to a bright part potential VL, whereby contrast between the dark part potential VD and the bright part potential VL forms an electrostatic latent image. A developing unit applies a developing bias Vdc to the formed electrostatic latent image. A development contrast which is a development potential difference between the developing bias Vdc and the bright part potential VL forms a toner image on a portion having the bright part potential VL of the surface of the photosensitive drum.

The toner image is transferred from the photosensitive drum to the printing material or the intermediate transfer body by applying a positive (positive-polarity) transfer bias Vt to the transfer unit (the transfer roller). On this occasion, in a case where toner transferred from the preceding photosensitive drum is already present in the printing material or the intermediate transfer body, the toner functions as a resistor, and a transfer current does not easily pass through from the transfer roller to the succeeding photosensitive drum. Accordingly, the absolute value of the potential of the succeeding photosensitive drum at a position where the transferred toner exists is higher than that of the succeeding photosensitive drum at another position. In a case where a potential difference is too large before charging by the charging roller, the charging roller cannot remove the potential difference completely, the potential does not become uniform after charging by the charging roller, the absolute value of the potential becomes higher than the dark part potential VD, and accordingly, even at the time of forming an electrostatic latent image by using the exposing unit, the absolute value of the potential becomes higher than the bright part potential VL. A development potential difference between the high absolute value of the potential and the developing bias Vdc at the time of forming the toner image by using the developing unit becomes smaller than an original development potential difference between the developing bias Vdc and the bright part potential VL. Accordingly, the amount of toner and the density become small as compared with another portion. As a result, the effect of toner transferred from the preceding photosensitive drum appears as "the transfer memory" in the image formed after the succeeding photosensitive drum rotates one round. On this occasion, as the amount of toner which has been transferred to the printing material or the intermediate transfer body becomes larger, "the transfer memory" is more likely to occur.

With respect to this "transfer memory," there is known a method for reducing "the transfer memory" by emitting uniform exposure light to the photosensitive drum to perform "pre-exposure" for making uniform the potential of the photosensitive drum before the charging unit (the charging roller) charges the photosensitive drum to the dark part potential VD.

Further, Japanese Patent Laid-Open No. 2005-250387 discloses a method for changing a voltage used for charging a photosensitive drum to a voltage value for reducing "the transfer memory" in a case where it is determined that an image having a large amount of toner and a high density is included.

Reduction of "the transfer memory" with "pre-exposure" adversely affects the life of the photosensitive drum, and accordingly, it is not preferable to perform "pre-exposure" during processing for printing all images. Therefore, only in the case of printing an image including an image having a large amount of toner and a high density, it is requested to perform "pre-exposure." Japanese Patent Laid-Open No. 2005-250387 discloses a technique of reducing "the transfer memory" by determining whether or not a high-density image is included. However, in a case where there is no image processing hardware for detecting a high-density image, it is impossible to determine whether or not a high-density image is included. Further, in a case where there is separately mounted software or hardware for detecting a high-density image, the speed of printing processing is lowered.

SUMMARY OF THE INVENTION

In an aspect of the present invention, there is provided an image forming apparatus having a counting unit configured to count an amount of toner used for an image to be printed for each color component, the image forming apparatus comprising: a setting unit configured to set a conversion coefficient used for processing for converting a pixel value in image data expressing the image into a signal value indicating the amount of toner; a converting unit configured to convert the pixel value into the signal value by using the set conversion coefficient; and an outputting unit configured to output information indicating whether or not a high-density image portion is included in the image based on the signal value obtained by performing the conversion.

Further features of the present invention will become apparent from the following description of exemplary embodiments (with reference to the attached drawings).

DESCRIPTION OF THE EMBODIMENTS

A mode for carrying out the present invention will be described below with reference to the drawings.

[Embodiment 1]

Figure 1:
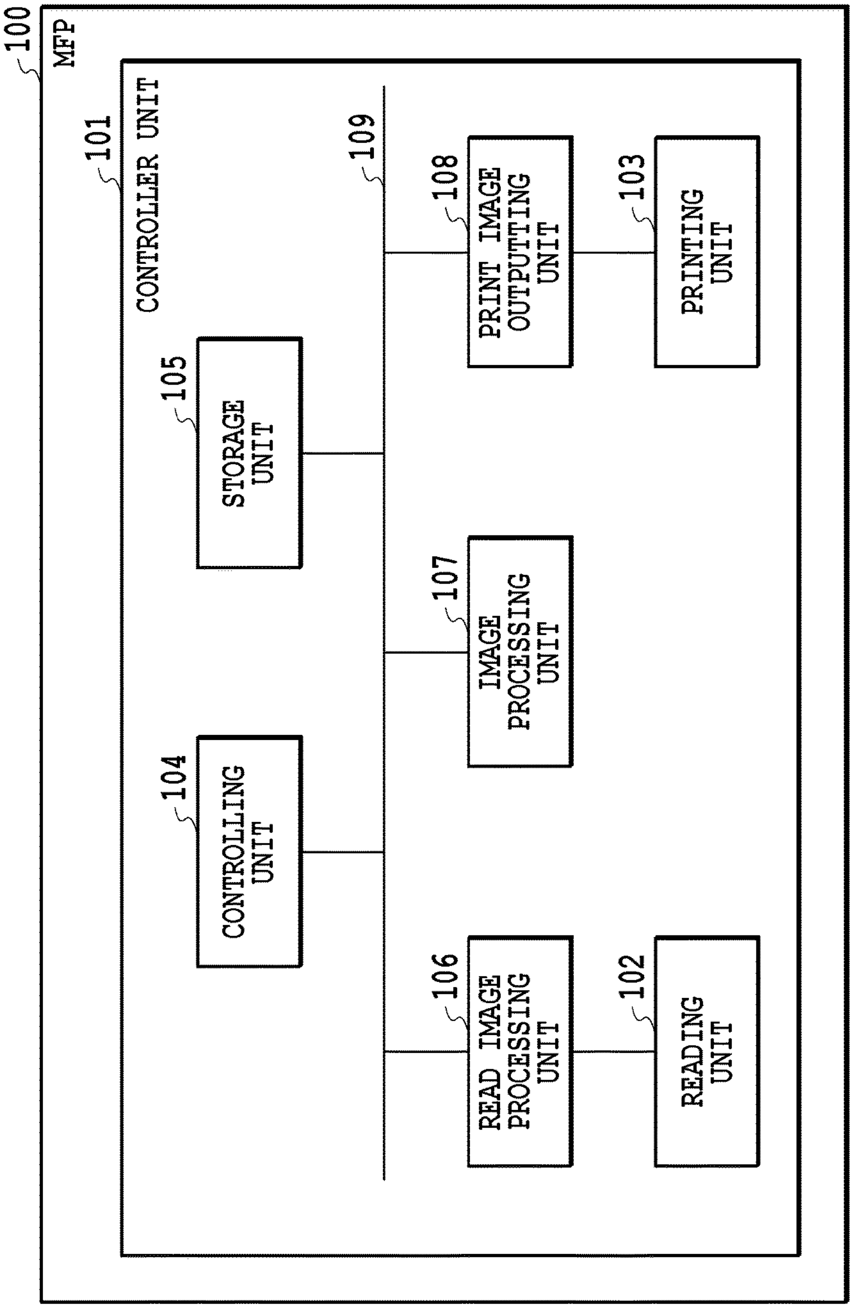
FIG. 1 is a diagram showing an example of the hardware configuration of an MFP according to an embodiment of the present invention.

FIG. 1 is a diagram showing an example of the hardware configuration of a multifunction peripheral (MFP) 100, which is an image forming apparatus of Embodiment 1. The MFP 100 includes a controller unit 101, a reading unit 102, and a printing unit 103. Further, the controller unit 101 includes a controlling unit 104, a storage unit 105, a read image processing unit 106, an image processing unit 107, a print image outputting unit 108, and an internal bus 109.

In FIG. 1, the reading unit 102 has the function of scanning a document to obtaining image data. The printing unit 103 has the function of printing an image on a printing medium such as a sheet. The controlling unit 104 is a processor for collectively controlling the controller unit 101 of the MFP 100, and controls each unit connected via the internal bus 109. The storage unit 105 is a memory or a HDD, and stores various instructions (including application programs) to be executed by the controlling unit 104 to control the controller unit 101. Further, the storage unit 105 temporarily stores image data scanned by the reading unit 102 and image data processed by the image processing unit 107. The read image processing unit 106 performs image processing on the image data scanned by the reading unit 102, and stores the image data in the storage unit 105. The image processing unit 107 reads the image data stored in the storage unit 105, and performs processing for converting an image into an image suitable for printing by the printing unit 103. The print image outputting unit 108 reads the image data stored in the storage unit 105, and transfers the image data to the printing unit 103. In the printing unit 103, photosensitive drums respectively corresponding to toners for four colors, that is, yellow (Y), magenta (M), cyan (C), and black (K) are arranged in a conveying direction in the order named.

Figure 2:
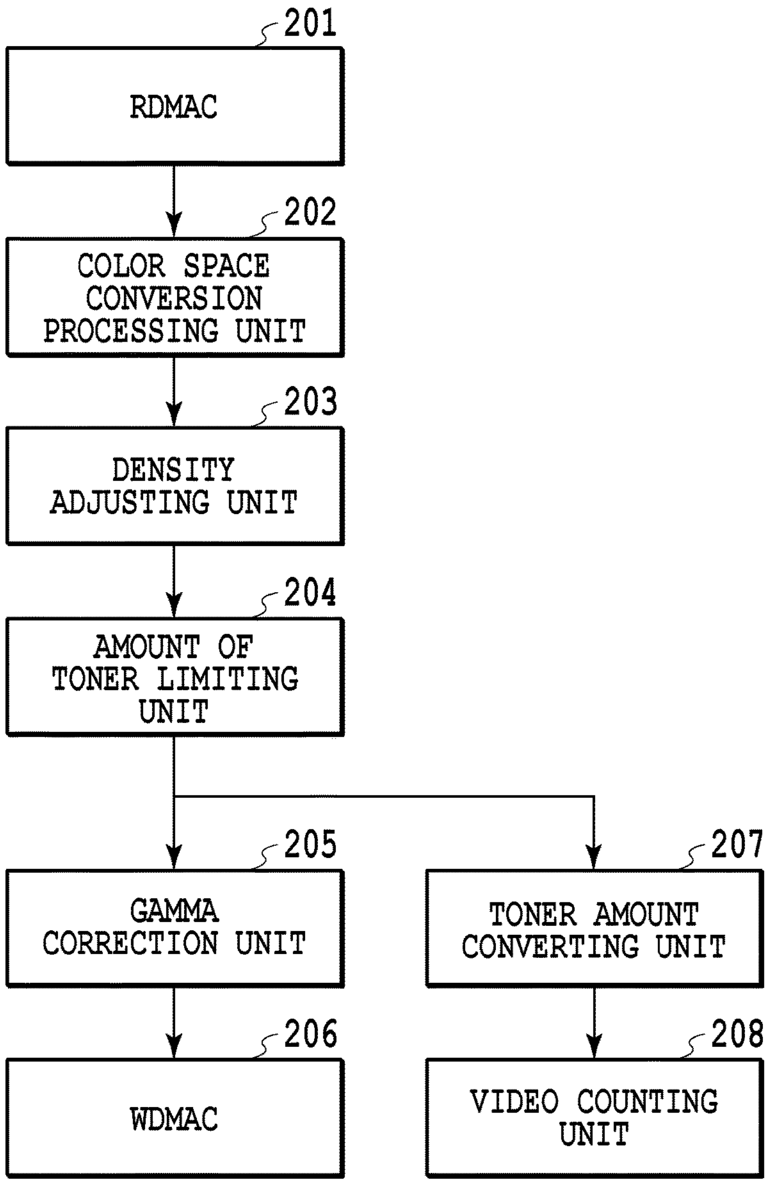
FIG. 2 is a diagram showing an example of the hardware configuration of an image processing unit according to the embodiment of the present invention.

FIG. 2 is a diagram showing an example of the hardware configuration of the image processing unit 107. An RDMAC 201 is a direct memory access controller (DMAC) for controlling reading of image data from the storage unit 105. Further, a WDMAC 206 is a DMAC for controlling writing of image data processed by the image processing unit 107 to the storage unit 105. A color space conversion processing unit 202 converts brightness image data such as RGB read by the reading unit 102 and stored in the storage unit 105 into density image data suitable for printing of CMYK and the like. A density adjusting unit 203 converts the density of image data according to a parameter set in the controlling unit 104 for each printing processing operation. An amount of toner limiting unit 204 performs image conversion processing to restrict the maximum density value of image data according to the parameter set in the controlling unit 104 and the job type of image data. A gamma correction unit 205 performs image conversion processing to adjust the density of image data according to the state of the printing unit 103. A toner amount converting unit 207 converts each pixel value in image data into a corresponding toner consumption amount in order to calculate the amount of toner consumed to print the image data by the printing unit 103. A video counting unit 208 counts each pixel value in image data converted by the toner amount converting unit 207 and obtains the sum of the pixel values. Counting is performed for each of colors CMYK, the controlling unit 104 notifies the printing unit 103 of the result of counting, and the printing unit 103 uses the result of counting to control toner supply.

Figure 3:
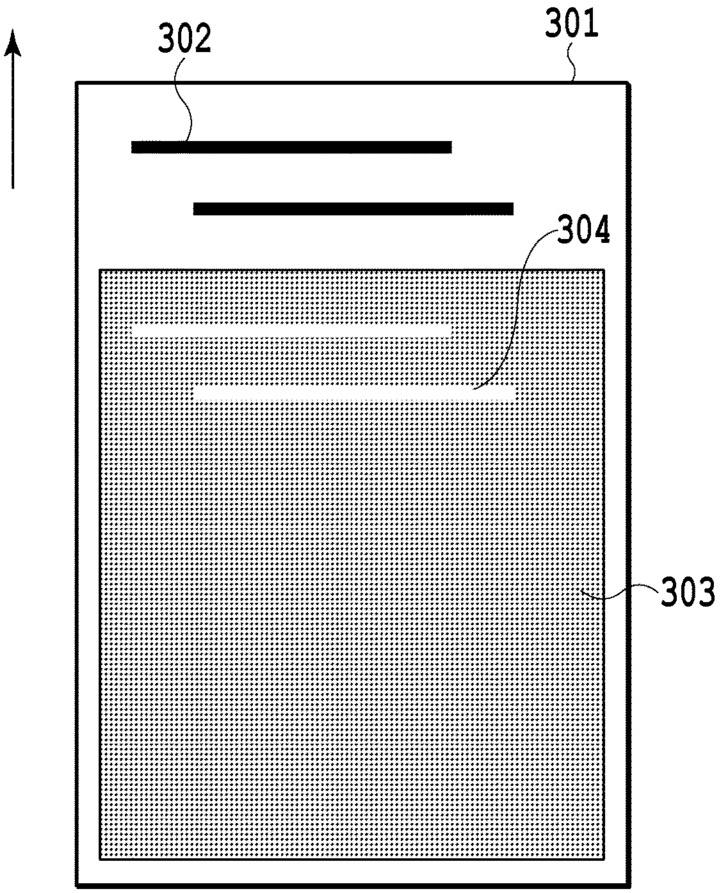
FIG. 3 is a view showing an example of an image in which "a transfer memory" appears.

FIG. 3 is a view showing an example of an image in which "a transfer memory" appears. FIG. 3 shows an output sheet 301 on which image data is printed by the printing unit 103, and an arrow shows a paper conveying direction. A high-density image portion 302 is an image portion in which toner is printed in up to a maximum limitation amount of toner. For example, the high-density image portion 302 is a red image having a density of 100%, and in this case, images of two colors, that is, yellow and magenta are printed at a density of 100%. A halftone image portion 303 is an image portion using a halftone and having a low density, and is, for example, a cyan halftone image. A transfer memory 304 is a transfer memory for the high-density image portion 302 which appears in the halftone image portion 303, and there appear portions of the halftone image portion 303 having a density lower than that of the other portions of the halftone image portion 303 and having the same shape as the high-density image portion 302. Further, a distance between the high-density image portion 302 and the transfer memory 304 is equal to the circumference of the photosensitive drum as explained later with respect to a mechanism of "the transfer memory." FIG. 3 shows an example in which the transfer memory appears in the same output sheet. However, in a case where the high-density image portion 302 is at a rear end of an output sheet with respect to the conveying direction, the transfer memory appears at a front end of a next output sheet.

Figure 4:
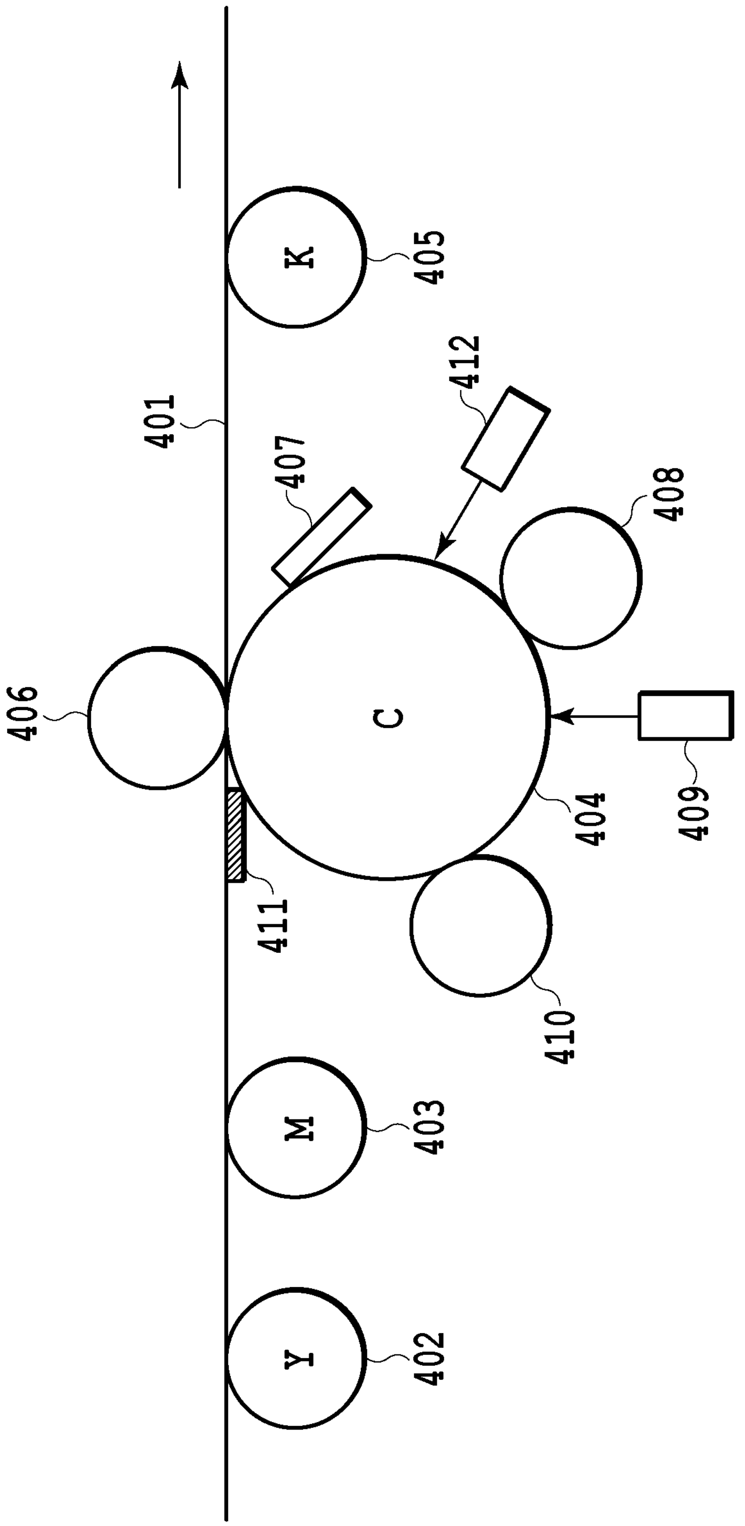
FIG. 4 is a view showing an example of the structure of a printing unit according to the embodiment of the present invention.

FIG. 4 is a view schematically showing image formation by an electrophotographic process in the printing unit 103 according to the present embodiment. A toner image formed on the photosensitive drum is primarily transferred to an intermediate transfer belt 401 successively to form a full-color toner image. An arrow shows a conveying direction of the intermediate transfer belt. Further, the toner image formed on the intermediate transfer belt 401 is secondarily transferred to an output sheet, which is a printing sheet, by a secondary transfer unit (not shown). Photosensitive drums 402 to 405 are photosensitive drums (image carriers) for forming toner images of respective colors CMYK. The photosensitive drums 402 to 405 are arranged in the order of yellow, magenta, cyan, and black with respect to the intermediate transfer belt 401, and primarily transfer toner images to the intermediate transfer belt successively.

Reference numerals 406 to 410 denote units accompanying each of the photosensitive drums 402 to 405. FIG. 4 shows only the units accompanying the cyan photosensitive drum 404 for convenience of explanation. However, similar units accompany the other photosensitive drums. A primary transfer unit 406 applies a positive (positive-polarity) transfer bias Vt, thereby transferring the toner image formed on the photosensitive drum 404 to the intermediate transfer belt 401. A cleaner 407 removes toner which is not transferred to the intermediate transfer belt 401 by the primary transfer unit 406, and which remains on the photosensitive drum 404. A charging roller 408 uniformly charges the photosensitive drum 404 to the dark part potential VD. An exposing unit 409 emits image exposure light according to the density of image data transferred from the controller unit 101 to the photosensitive drum 404 to change a potential to the bright part potential VL, and forms an electrostatic latent image by using a contrast between the dark part potential VD and the bright part potential VL. A developing unit 410 applies the developing bias Vdc, and forms a toner image on a portion having the bright part potential VL of the surface of the photosensitive drum by using a development contrast which is a development potential difference between the developing bias Vdc and the bright part potential VL. A pre-exposure unit 412 performs “pre-exposure” to uniformly expose the photosensitive drum 404 before charging by the charging roller 408.

A toner image 411 is a toner image transferred to the intermediate transfer belt 401 and is a toner image transferred from the preceding yellow and magenta photosensitive drums.

Figure 5A:
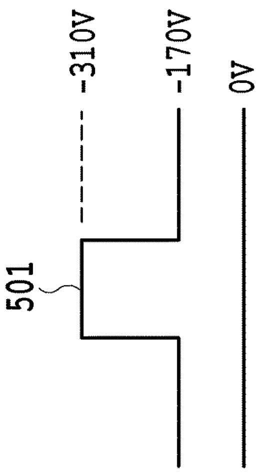
FIGS. 5A to 5C are graphs for explaining an example of an image forming process according to the embodiment of the present invention.
Figure 5B:
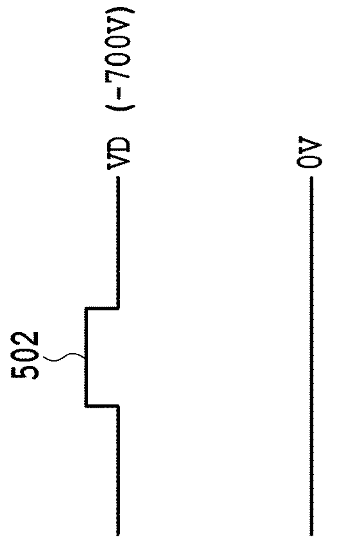
Figure 5C:
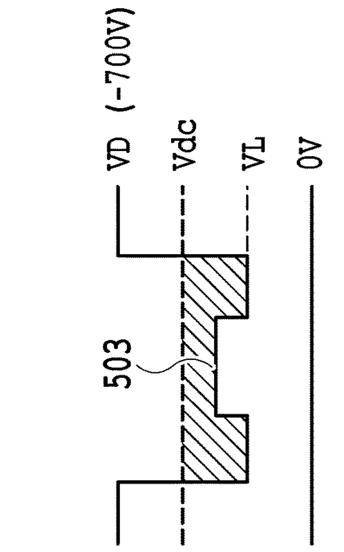

Next, with reference to FIGS. 4 and 5A to 5C, explanation will be made on a mechanism in which “the transfer memory” appears as shown in FIG. 3. FIGS. 5A to 5C are graphs showing the potential of the photosensitive drum 404. FIG. 5A shows the potential after the primary transfer unit transfers the toner image, FIG. 5B shows the potential after the charging roller 408 charges the photosensitive drum 404 to the dark part potential VD, and FIG. 5C shows the potential after the exposing unit 409 forms the electrostatic latent image.

In a case where the toner image 411 is already transferred to the intermediate transfer belt 401 at the time of transferring the toner image 411 to the intermediate transfer belt 401 by the primary transfer unit 406, toner functions as a resistor, and accordingly, a transfer current does not pass through easily from the primary transfer unit 406 to the photosensitive drum 404. This phenomenon occurs remarkably in a case where the toner amount of the toner image 411 on the intermediate transfer belt is large. For example, this phenomenon occurs remarkably in a case where as the high-density image portion, a red toner image having a density of 100% is formed of a yellow toner image having an amount of 100% and a magenta toner image having an amount of 100%. In this case, the absolute value of the potential of the high-density image portion on the photosensitive drum 404 is higher than the absolute value of the potential of the other image portion as shown in a potential 501 in FIG. 5A. Further, this potential difference becomes larger as the image density of the high-density image portion becomes higher, that is, as the amount of toner of the toner image formed on the intermediate transfer belt 401 becomes larger.

A potential state at the time of transferring the toner image by the primary transfer unit 406 is a state in which in a case where a portion having a large potential difference exists as shown by the potential 501, the potential difference cannot be removed completely even after the charging roller 408 uniformly charges the photosensitive drum 404 to the dark part potential VD. Accordingly, even after charging by the charging roller 408, the absolute value of the potential becomes higher than the dark part potential VD as shown by a potential 502 of FIG. 5B.

In a case where the exposing unit 409 forms the electrostatic latent image in this state, as shown by a potential 503 in FIG. 5C, a potential difference remains even with respect to the bright part potential VL, and the absolute value of the potential becomes higher than the bright part potential VL. Accordingly, at the time of forming the toner image by the developing unit 410, the development potential difference between the potential 503 and the development biasing potential Vdc becomes smaller than a potential difference between the developing bias Vdc and the bright part potential VL, which is an original potential difference. Therefore, the toner amount of the formed toner image is small, and the density of the toner image is low. This density difference is a phenomenon called “the transfer memory.”

In this manner, “the transfer memory” appears in an image which is transferred after the photosensitive drum rotates one round with respect to the high-density image portion. In the present embodiment, the length of the circumference of the photosensitive drum 404 is 94 mm, and accordingly, in a case where the high-density image portion exists 94 mm or more ahead of the rear end of an output sheet relative to the conveying direction of the output sheet, “the transfer memory” appears in the same image. On the other hand, in a case where the high-density image portion exists in the rear end relative to the conveying direction of the output sheet, “the transfer memory” appears in a front end portion of a next output sheet.

Further, “the transfer memory” appears in a case where a low-density toner image is formed in a portion in which a potential difference is generated on the photosensitive drum. In a case where a high-density toner image is formed, the phenomenon is not likely to be conspicuous, and in a case where a toner image is not formed in a blank sheet, the phenomenon does not occur.

In the printing unit of the present embodiment, in a case where as the high-density image portion, a tone image having an amount (density) of more than 140% is formed on the intermediate transfer belt 401, “the transfer memory” may appear. Incidentally, in this embodiment, the maximum amount of toner adhered from one photosensitive drum is 100%. Accordingly, in the printing unit of the present embodiment, “the transfer memory” may appear in the following cases, for example. More specifically, in a case where a toner image is formed by the yellow photosensitive drum 402 and the magenta photosensitive drum 403, and transferred to the intermediate transfer belt 401, and the total toner amount of the toner image exceeds 140%, "the transfer memory" may appear in the cyan photosensitive drum 404. In another case where a toner image is formed by the yellow, magenta, and cyan photosensitive drums 402 to 404, and the total toner amount of the toner image exceeds 140%, "the transfer memory" may appear in the black photosensitive drum 405.

In the printing portion of the present embodiment, the pre-exposure unit 412 performs "pre-exposure" processing to reduce "the transfer memory." The "pre-exposure" processing is to emit uniform exposure light to the photosensitive drum 404 whose remaining toner is removed by the cleaner 407 before being charged to the dark part potential VD by the charging roller 408, and make the potential of the photosensitive drum uniform.

However, depending on the characteristics of the photosensitive drum, performing the "pre-exposure" processing for all printing processing may adversely affect the durability of the photosensitive drum. Accordingly, it is required to determine whether or not image data to be printed includes the high-density image portion which may cause "the transfer memory," and perform the "pre-exposure" processing only in a case where the high-density image portion exists. In the present embodiment, an existing configuration is used to determine whether or not the high-density image portion exists.

Figure 6:
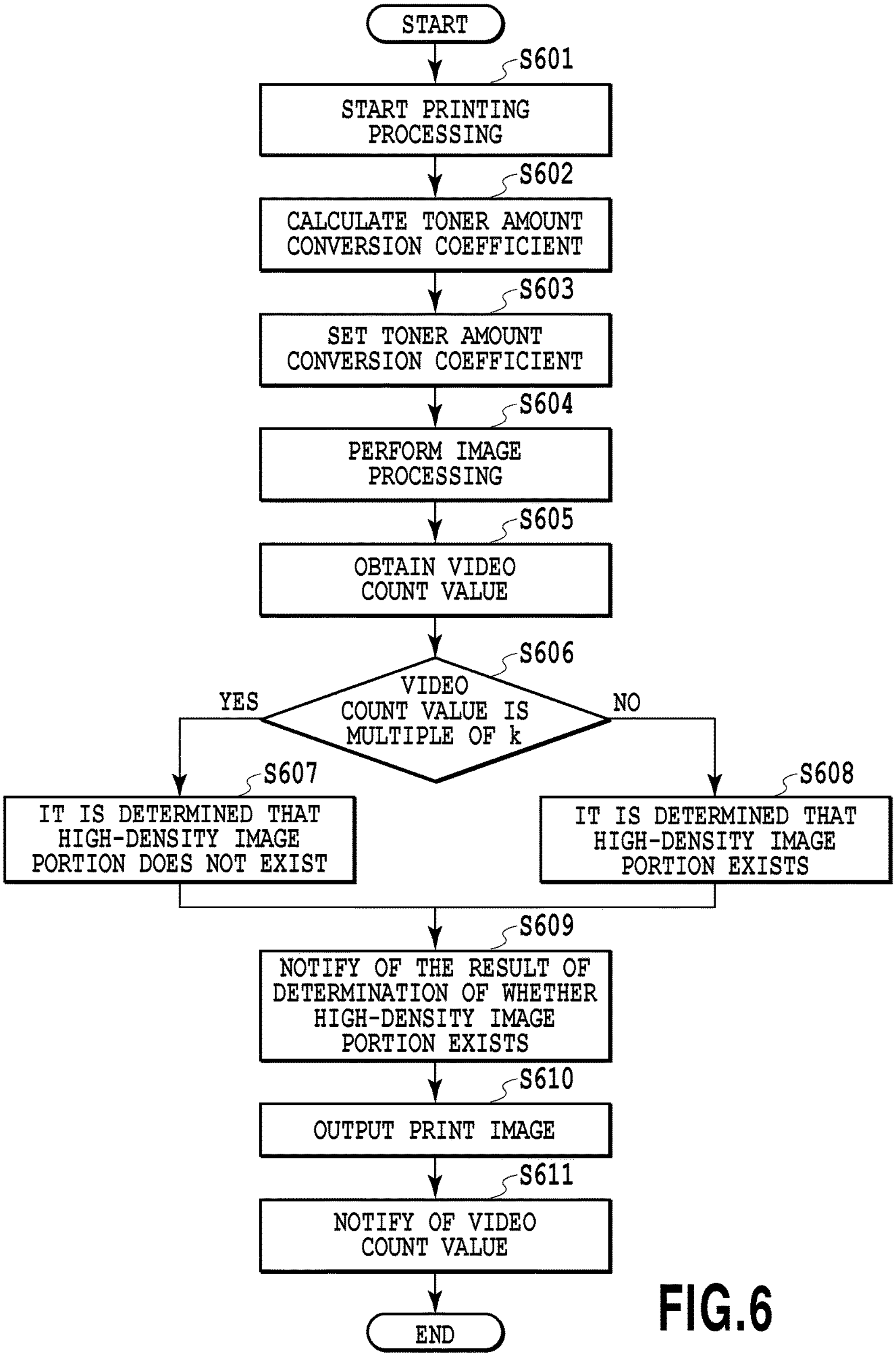
FIG. 6 is a flowchart showing a flow of printing processing in an MFP according to the first embodiment of the present invention.

Next, with reference to FIG. 6, explanation will be made on the operation of an MFP 100 of the present embodiment. FIG. 6 is a flowchart showing a flow of printing processing in the MFP 100. Incidentally, in the present embodiment, an application (a program) stored in the storage unit 105 is started in response to a user's operation and instruction, and executed by the controlling unit 104 to realize the following steps.

In a case where the user instructs the MFP to perform printing, and a print job is input to the MFP 100, the controlling unit 104 obtains image data to be printed and starts printing processing in step S601. In the printing processing, the controlling unit 104 uses the image processing unit 107, and determines whether or not the high-density image portion exists. Explanation will made below on processing for determining whether the high-density image portion exists in the printing processing performed by the controlling unit 104.

In step S602, the controlling unit 104 calculates a toner amount conversion coefficient to be set to the toner amount converting unit 207. The toner amount conversion coefficient is, for example, of a lookup-table (hereinafter referred to as LUT) type, and is used to convert the signal value of each pixel of image data. More specifically, the toner amount conversion coefficient can also be said to be a toner amount conversion table. The following method is performed to calculate the toner amount conversion coefficient for making it possible to determine whether the high-density image portion exists.

The toner amount conversion coefficient is designed to correspond to the characteristics of the printing unit 103. This original toner amount conversion coefficient designed to correspond to the characteristics of the printing unit will be referred to as the original toner amount conversion coefficient. The original toner amount conversion coefficient LUT is f(x), where x is the signal value of each pixel of image data. Further, the signal value of image data which should be determined to be the high-density image portion is l. In the present embodiment, two signal values l which are 245 and 255 are signal values based on which image data should be determined to be the high-density image portion. Further, a constant k is set for each of color components CMYK. The constant k is as small a number as possible selected from among prime numbers relatively prime to the maximum density. Namely, the constant k is as small a number as possible selected from among prime numbers other than 3, 5, and 17, which are relatively prime factors of 255 for the maximum density. In the present embodiment, the constant k for the color component cyan is 7, the constant k for the color component magenta is 7, the constant k for the color component yellow is 11, and the constant k for the color component black is 7.

Using the above values, the controlling unit 104 converts the original toner amount conversion coefficient LUT f(x). The controlling unit 104 converts the original toner amount conversion coefficient LUT f(x) according to the following formula (1):

$$y(x) = \begin{cases} \lfloor f(x) \div k + 0.5 \rfloor \times k & (f(x) \neq l) \\ 255 & (f(x) = l) \end{cases} \quad (1)$$

where y(x) is a toner amount conversion coefficient after conversion.

An upper portion of the formula (1) indicates multiplying the constant k by the integer part of f(x) divided by the constant k plus 0.5. Accordingly, in the case of using the toner amount conversion coefficient LUT y(x) obtained by performing the above conversion, a pixel having a signal value other than the signal values l of the high-density image portion is converted into a signal value which is a multiple of the constant k. Incidentally, the formula (1) can also be applied to a case where a predetermined threshold such as 244 is used and conversion is performed according to whether f(x) is larger than the predetermined threshold or whether f(x) is equal to or smaller than the predetermined threshold.

Figure 7:
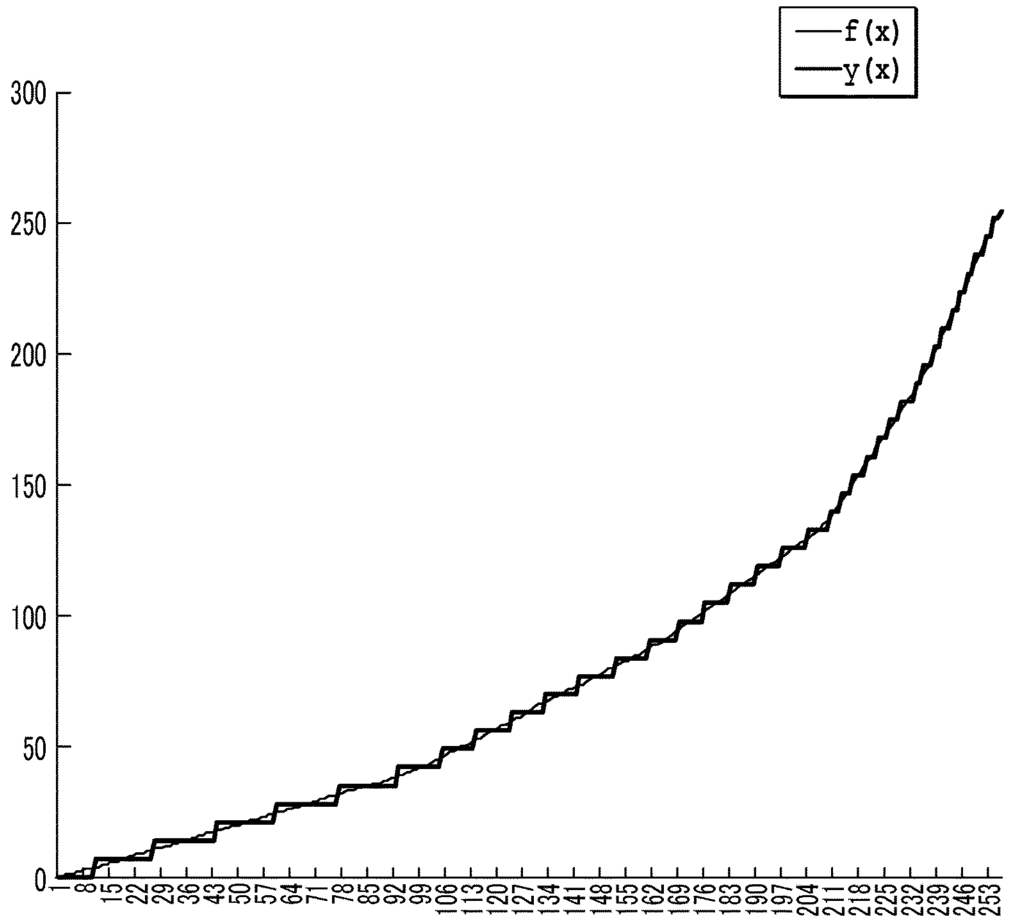
FIG. 7 is a graph showing an example of a parameter which is applied to the image processing unit according to the first embodiment of the present invention.

FIG. 7 is a graph of the original toner amount conversion coefficient LUT f(x) and the toner amount conversion coefficient y(x) after conversion for magenta according to the present embodiment. Incidentally, the signal value 1 of the high-density image portion is converted into 255, but the constant k is selected from among prime numbers other than 3, 5, and 17, and 255 is not a multiple of k. Accordingly, in a step described later, the controlling unit 104 refers to a video count value which is the sum of the signal values of pixels after application of LUT as calculated by the video counting unit 208 for image data to which the toner amount conversion coefficient LUT y(x) is applied. More specifically, it becomes possible to determine whether or not the high-density image portion exists based on whether or not the video count value is a multiple of the constant k. In a case where the high-density image portion exists, there exist one or more pixels whose signal values are converted into 255 by LUT y(x), and accordingly, the video count value which is the sum of the signal values of the pixels is not a multiple of the constant k. On the other hand, in a case where the high-density image portion does not exist, all the signal values are converted into multiples of the constant k by LUT y(x), and the video count value which is the sum of the signal values of the pixels is also a multiple of the constant k. Accordingly, the controlling unit 104 can determine whether or not the high-density image portion exists based on whether or not the video count value is a multiple of the constant k.

More specifically, in the present embodiment, the video count value is finely adjusted to a value such that it is possible to determine whether or not the high-density image portion exists. Meanwhile, this video count value itself is used as the video count value as it is for toner supply control. The video count value calculated by the video counting unit 208 is, as described above, based on the calculated toner amount conversion coefficient LUT y(x), and is not equal to the original toner amount conversion coefficient f(x). Accordingly, an error is caused by converting the toner amount conversion coefficient LUT for a portion other than the high-density image portion into a multiple of the constant k, but the video count value can be obtained as in the case of using f(x) as the toner amount conversion coefficient LUT as it is. Further, the video count value calculated by the video counting unit 208 is used for the toner supply control in the printing unit 103, and the error caused by conversion into the toner amount conversion coefficient LUT y(x) is at a level which does not affect the toner supply control. Accordingly, in the present embodiment, whether or not the high-density image portion exists can be determined by using existing data used for the toner supply control.

In this manner, the controlling unit 104 determines whether or not the high-density image portion exists based on whether or not the video count value is a multiple of the constant k. Accordingly, in a case where the number of pixels in the high-density image portion in the image data is a multiple of the constant k, the video count value is also a multiple of the constant k, and the controlling unit 104 determines that the high-density image portion does not exist. In order to reduce the probability that this problem will arise, the present embodiment uses different values as the constants k for magenta and yellow. A condition in which "the transfer memory" is likely to occur is, as described above, that the magenta and/or yellow high-density image portions exist and a toner image having a high amount of toner is formed on the intermediate transfer belt 401. In the present embodiment, the printing unit 103 performs the "pre-exposure" processing in a case where the magenta and/or yellow high-density image portions exist. Different values are used as the constants k for magenta and yellow, whereby either of the yellow and magenta high-density image portions is detected, and the probability of erroneous determination is reduced.

Next, returning to FIG. 6, subsequent processing will be described. In step S603, the controlling unit 104 sets the toner amount conversion coefficient calculated in step S602 to the toner amount converting unit 207.

In step S604, the controlling unit 104 inputs image data read from the storage unit 105 to the image processing unit 107, and the image processing unit 107 performs image processing. In the image processing, the image data read from the storage unit 105 is subjected to the image processing by the image processing units 202 to 204, and input to the toner amount converting unit 207. The toner amount converting unit 207 converts the signal value of each pixel of the image data according to the toner amount conversion coefficient set in step S603. The image data converted by the toner amount converting unit 207 is input to the video counting unit 208. The video counting unit 208 calculates the sum of all the signal values of the pixels in the image data as the video count value of the image. The video counting unit 208 calculates the video count value for each of the color components CMYK.

In step S605, the controlling unit 104 obtains the video count value for each of the color components CMYK from the video counting unit 208 after performing the image processing on one-page image data in step S604.

In step S606, the controlling unit 104 determines whether or not the high-density image portion exists in the image data based on whether or not the video count value for each of the color components CMYK obtained in step S605 as described above is a multiple of the constant k. The determination is made for each of the color components CMYK. In a case where in step S606, the video count value obtained in step S605 is a multiple of the constant k, the controlling unit 104 determines in step S607 that the high-density image portion does not exist in the image data. On the other hand, in a case where in step S606, the video count value obtained in step S605 is not a multiple of the constant k, the controlling unit 104 determines in step S608 that the high-density image portion exists in the image data.

In step S609, the controlling unit 104 notifies the printing unit 103 of information indicating the result of the determination of whether the high-density image portion exists for each of the color components CMYK as determined in steps S607 and S608. The printing unit 103 performs control regarding whether or not to perform the "pre-exposure" processing in forming an image by using the result of the determination of whether or not the high-density image portion exists as given by the controlling unit 104. For example, in a case where it is determined that the high-density image portion exists for at least one of the cyan and magenta color components as described above, control is performed to perform the "pre-exposure" processing. Naturally, the present embodiment is not limited to this combination, and in the present embodiment, in a case where it is determined that the high-density image portion exists for at least one of the color components, control can be performed to perform the "pre-exposure" processing. In a case where it is determined that the high-density image portion exists, the "pre-exposure" processing is performed on the photosensitive drums for all the colors, for example. Otherwise, the "pre-exposure" processing may be performed only on a downstream photosensitive drum in which the "transfer memory" may appear.

In step S610, the controlling unit 104 reads image data which is subjected to image processing by the image processing unit 107 and temporarily stored in the storage unit 105, inputs the image data to the print image outputting unit 108, and performs print image processing. The image data which is subjected to the print image processing by the print image outputting unit 108 is transferred to the printing unit 103, and the printing unit 103 performs image forming processing to print an output sheet.

In step S611, the controlling unit 104 notifies the printing unit 103 of the video count value for each of the color components CMYK obtained in step S605. The printing unit 103 estimates the consumption amount of toner used for the image forming processing by using the video count value given by the controlling unit 104 and performs the toner supply control at the printing unit 103.

The above is the explanation on processing for detecting the high-density image portion in the image data in order to cope with "the transfer memory" in the MFP 100. By using the video counting processing, this processing makes it possible to determine whether the high-density image portion exists in the image data and to obtain the video count value used for toner supply control. In this manner, the present embodiment uses processing for calculating the video count, thereby making it possible to calculate the video count value and to detect the high-density image without reducing the processing speed of printing processing.

[Embodiment 2]

Next, with reference to FIGS. 6 and 8, explanation will be made on the operation of the MFP 100 of Embodiment 2. FIG. 6 is the flowchart showing the flow of the printing processing of the MFP 100, and is the same as the flowchart for Embodiment 1. Further, in the present embodiment, the hardware configuration and software configuration of the MFP 100 and the schematic of image forming are the same as those explained in Embodiment 1.

A difference between Embodiment 1 and Embodiment 2 lies only in processing for calculating the toner amount conversion coefficient in step S602. Accordingly, in Embodiment 2, only this difference will be described.

In step S602, the controlling unit 104 calculates the toner amount conversion coefficient to be set to the toner amount converting unit 207. In Embodiment 2, the toner amount conversion coefficient for enabling determination of the high-density image portion is calculated by the following method.

In Embodiment 2, the original toner amount conversion coefficient LUT is f(x) as in Embodiment 1. Here, x is the signal value of each pixel in the image data. Further, a threshold for the density of the image data to be determined as the high-density image portion is m %. A pixel corresponding to a density wherein the signal value of the image data exceeds m % constitutes the high-density image portion. Further, the constant k is set for each of the color components CMYK. The constant k is as small a number as possible selected from among prime numbers other than 3, 5, and 17 as in Embodiment 1. In the present embodiment, the constant k is set at 7 for each of the color components CMYK unlike in Embodiment 1.

Using the above values, the controlling unit 104 converts the original toner amount conversion coefficient LUT f(x). The controlling unit 104 converts the original toner amount conversion coefficient LUT f(x) according to the following formula (2):

$$y(x)=\begin{cases}\lfloor f(x)\div k+0.5\rfloor\times k & (f(x)\le(255\times m\div 100))\\ \lfloor f(x)\div k+0.5\rfloor\times k+3 & (f(x)>(255\times m\div 100))\end{cases}\tag{2}$$

where y(x) is the toner amount conversion coefficient after conversion.

A pixel having a signal value corresponding to a density of m % or less is converted into a signal value which is a multiple of the constant k by the toner amount conversion coefficient LUT y(x) obtained by performing the conversion. The signal value of the high-density image portion having the signal value corresponding to a density of more than m % is converted into a signal value which is a multiple of the constant k+3.

Figure 8:
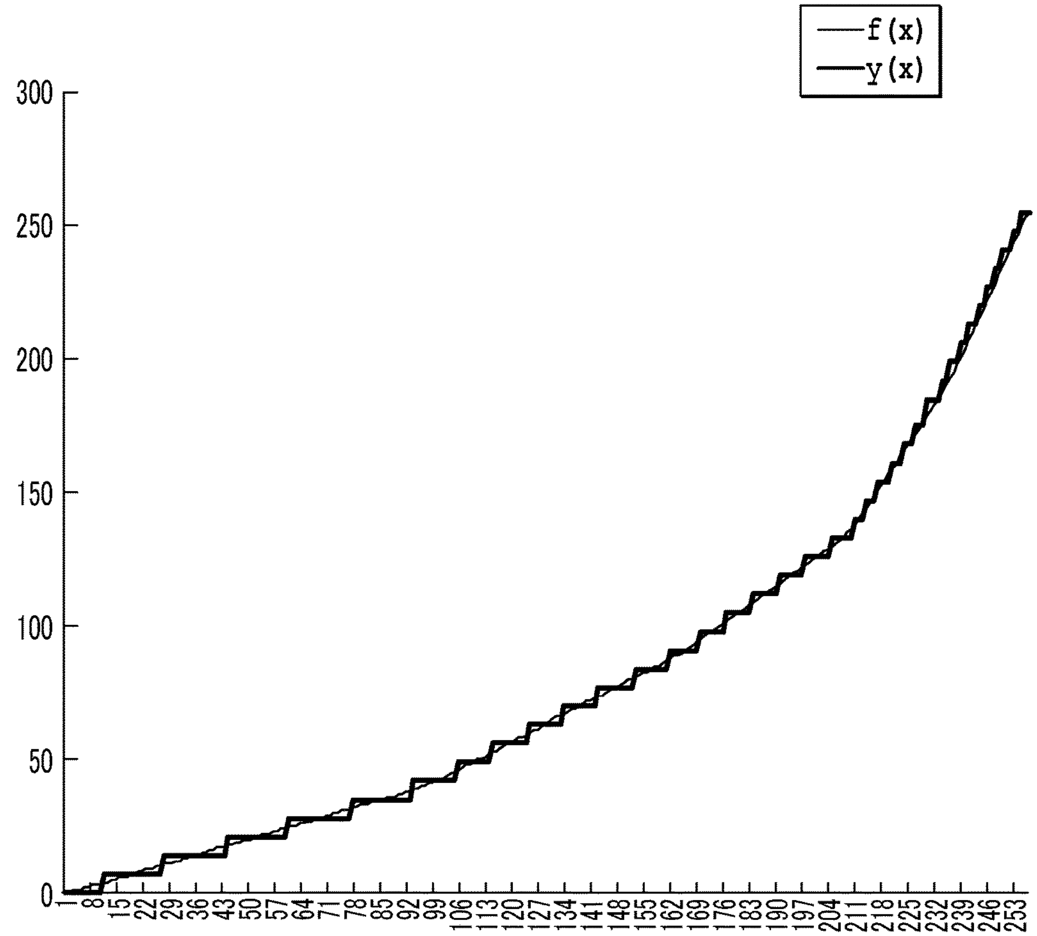
FIG. 8 is a graph showing an example of a parameter which is applied to the image processing unit according to a second embodiment of the present invention.

FIG. 8 is a graph of the magenta original toner amount conversion coefficient LUT f(x) and the toner amount conversion coefficient LUT y(x) after conversion according to the embodiment of the present invention.

Since the constant k is 7 in the present embodiment, a multiple of the constant k+3 is not a multiple of the constant k. Accordingly, the controlling unit 104 refers to the video count value which is the sum of the signal values of the pixels after application of LUT as calculated by the video counting unit 208 for the image data to which the toner amount conversion coefficient LUT y(x) is applied. It becomes possible to determine whether or not the high-density image portion having the density of more than m % exists based on whether or not the video count value is a multiple of the constant k. In other words, in a case where the high-density image portion exists, there exist one or more pixels whose signal values are converted into multiples of the constant k+3 by LUT y(x), and accordingly, the video count value which is the sum of the signal values of the pixels is not a multiple of the constant k. On the other hand, in a case where the high-density image portion does not exist, all the signal values are converted into multiples of the constant k by LUT y(x), and the video count value which is the sum of the signal values of the pixels is also a multiple of the constant k. Accordingly, the controlling unit 104 can determine whether or not the high-density image portion exists based on whether or not the video count value is a multiple of the constant k. Meanwhile, an error is caused in the video count value calculated by the video counting unit 208 by converting the toner amount conversion coefficient LUT for a portion other than the high-density image portion into a multiple of the constant k and converting the toner amount conversion coefficient LUT for the high-density image portion into a multiple of the constant k+3. However, the video count value can be obtained as in the case of using f(x) as the toner amount conversion coefficient LUT as it is. Further, the video count value calculated by the video counting unit 208 is used for the toner supply control in the printing unit 103, and the error caused by conversion into the toner amount conversion coefficient LUT y(x) is at a level which does not affect the toner supply control.

The controlling unit 104 determines the high-density image portion based on whether or not the video count value is a multiple of the constant k. Accordingly, in a case where the number of pixels of the high-density image portion in the image data is a multiple of the constant k, the video count value is also a multiple of the constant k, and the controlling unit 104 determines that the high-density image portion does not exist.

In Embodiment 1, explanation has been made on the example in which the printing unit 103 performs the "pre-exposure" processing in a case where the printing unit 103 is informed of the determination that the high-density image portion exists for one of the color components CMY among the results of the determinations of whether or not the high-density image portion exists for the color components CMYK as given by the controlling unit 104 in step S609. The printing unit 103 of the present embodiment performs the "pre-exposure" processing in a case where the printing unit 103 is informed of the determination that the high-density image portion exists for two of the color components CMY among the results of the determinations of whether or not the high-density image portion exists for the color components CMYK as given by the controlling unit 104 in step S609. In other words, the printing unit 103 performs the "pre-exposure" processing in a case where the high-density image portion exists for a combination of two color components C and M, C and Y, or M and Y or a combination of three color components C, M, and Y. As in Embodiment 1, the "pre-exposure" processing may be performed on the photosensitive drums for all the colors, or only on a downstream photosensitive drum affected by the "transfer memory." In this manner, in the present embodiment, the printing unit 103 performs the "pre-exposure" processing in a case where the printing unit is informed of the determination that the high-density image portion exists for two of the color components CMY. Accordingly, unlike in Embodiment 1, the same value is used for the constant k for each of the color components CMYK, thereby reducing the probability that it is erroneously determined whether or not the high-density image portion exists.

The above is the explanation on processing for detecting the high-density image portion in the image data in order to cope with “the transfer memory” in the MFP 100. By using the video counting processing, this processing makes it possible to determine whether or not the high-density image portion having the density of more than m % exists in the image data and to obtain the video count value used for toner supply control.

[Embodiment 3]

Figure 9:
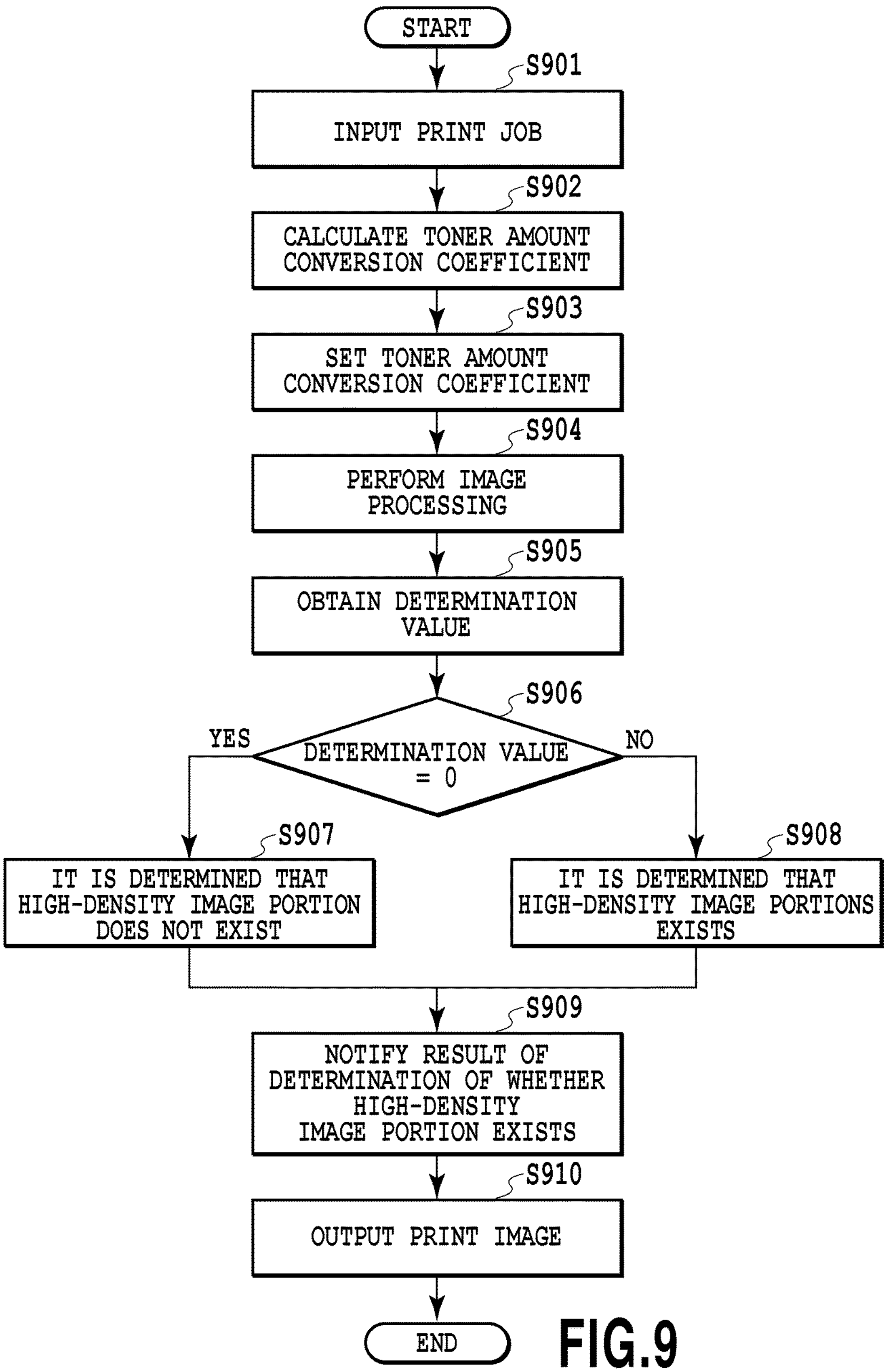
FIG. 9 is a flowchart showing a flow of printing processing in the MFP according to a third embodiment of the present invention.
Figure 10:
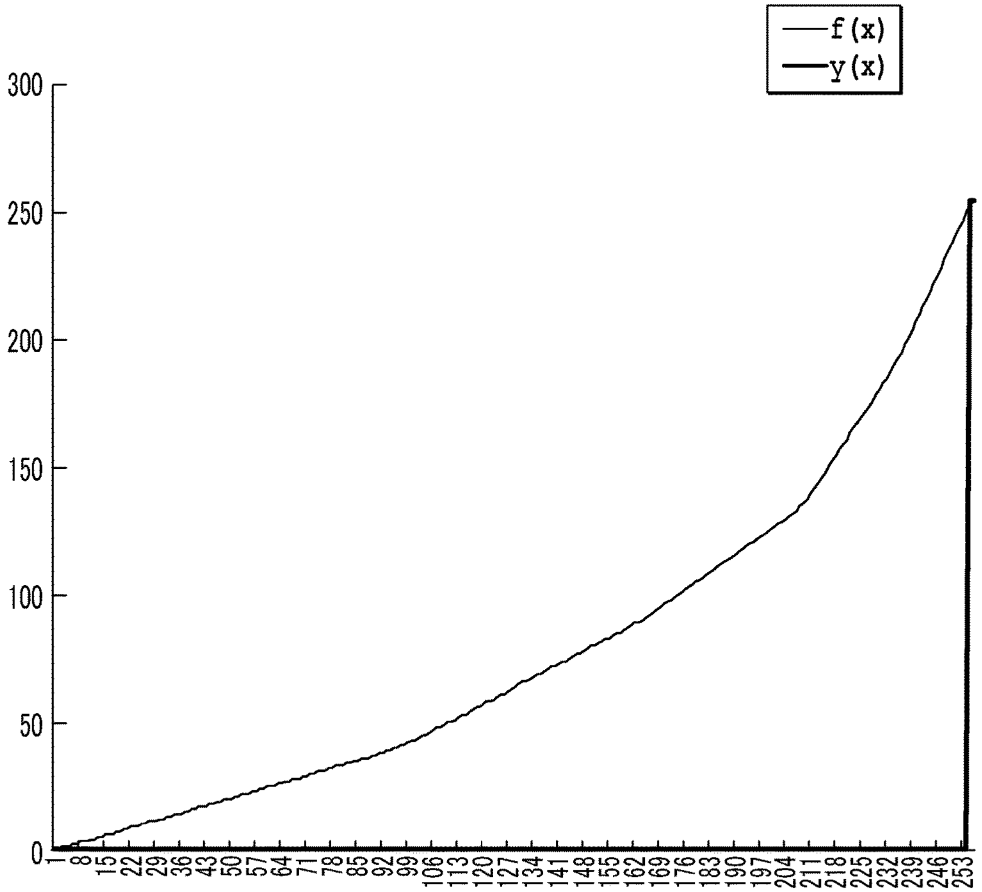
FIG. 10 is a graph showing an example of a parameter which is applied to the image processing unit according to the third embodiment of the present invention.

Next, with reference to FIGS. 9 and 10, explanation will be made on the operation of the MFP 100 of Embodiment 3. FIG. 9 is a flowchart showing a flow of printing processing in the MFP 100. Steps S901, S903, S904, S909, and S910 in FIG. 9, which is the flowchart, are the same as steps S601, S603, S604, S609, and S610 in the flowchart for Embodiment 1. Further, in the present embodiment, the hardware configuration and software configuration of the MFP 100 and the schematic of image forming are the same as those explained in Embodiment 1.

Accordingly, explanation will be made on only differences between the flowchart (FIG. 9) for the present embodiment and the flowchart for Embodiment 1.

In step S902, the controlling unit 104 calculates the toner amount conversion coefficient to be set to the toner amount converting unit 207. Also in the present embodiment, the original toner amount conversion coefficient LUT corresponding to the characteristics of the printing unit 103 is f(x) where x is the signal value of each pixel of the image data. Further, the signal value of the image data which should be determined to be the high-density image portion is l. In the present embodiment, the two signal values l which are 245 and 255 are the signal values based on which the image data should be determined to be the high-density image portion.

In the present embodiment, the video count value is converted into a determination value indicating whether or not the high-density image portion exists by using the toner amount conversion coefficient. In Embodiments 1 and 2, explanation has been made on the examples in which the value converted by using the toner amount conversion coefficient is used as the video count value for the toner supply control in the video counting unit 208. In the present embodiment, a value (a determination value) converted by using the toner amount conversion coefficient is not used as the video count value for toner supply control in the video counting unit 208. The controlling unit 104 converts the original toner amount conversion coefficient LUT f(x) according to the following formula (3).

$$y(x) = \begin{cases} 0 & (f(x) \neq l) \\ 255 & (f(x) = l) \end{cases} \quad (3)$$

where y(x) is the toner amount conversion coefficient after conversion.

The signal value of a pixel having a signal value other than the signal value l of the high-density image portion is converted into 0 by the toner amount conversion coefficient LUT y(x) obtained by performing the conversion, and the signal value l of the high-density image portion is converted into 255.

The controlling unit 104 can determine whether or not the high-density image portion exists based on whether or not the determination value which is the sum of the signal values of the pixels after application of LUT is 0 for the image data to which the toner amount conversion coefficient LUT y(x) is applied. In a case where the high-density image portion exists, there exist one or more pixels whose signal values are converted into 255 by LUT y(x), and accordingly, the determination value which is the sum of the signal values of the pixels is not 0. In a case where the high-density image portion does not exist, all the signal values are converted into 0 by LUT y(x), and accordingly, the determination value which is the sum of the signal values of the pixels is 0. FIG. 10 is a graph of examples of the magenta original toner amount conversion coefficient LUT f(x) and the toner amount conversion coefficient y(x) after conversion according to the present embodiment.

In step S905, the controlling unit 104 obtains the determination value calculated by the video counting unit 208 in step S904. In step S906, the controlling unit 104 determines whether or not the high-density image portion exists in the image data based on whether or not the determination value obtained in step S905 is 0 as stated above. The determination is made for each of the color components CMYK. In a case where it is determined in step S906 that the determination value obtained in step S905 is 0, the controlling unit 104 determines in step S907 that the high-density image portion does not exist in the image data. On the other hand, in a case where it is determined in step S906 that the determination value obtained in step S905 is not 0, the controlling unit 104 determines in step S908 that the high-density image portion exists in the image data.

In step S909, the controlling unit 104 notifies the printing unit 103 of the results of the determinations of whether or not the high-density image portion exists for each of the color components CMYK as determined in steps S907 and S908. The printing unit 103 performs control regarding whether or not to perform the “pre-exposure” processing in forming an image by using the results of the determinations of whether or not the high-density image portion exists as given by the controlling unit 104.

Incidentally, in the present embodiment, the printing unit 103 uses the video count value, not the determination value calculated by the video counting unit 208 for the toner supply control.

The above is the explanation on processing for detecting the high-density image portion in the image data in order to cope with “the transfer memory” in the MFP 100. By using the video counting processing, this processing makes it possible to determine whether or not the high-density image portion exists in the image data.

<Other Embodiments>

In the above embodiments, explanation has been made on the examples in which the printing unit 103 is informed of the results of the determinations of whether or not the high-density image portion exists. However, it is possible to use a configuration in which in a case where the printing unit 103 is set to perform “pre-exposure” by default, for example, only if the high-density image portion does not exist, the printing unit 103 is informed of this. On the other hand, it is possible to use a configuration in which in a case where setting is not made to perform “pre-exposure” by default, only if the high-density image portion exists, the printing unit 103 is informed of this.

According to the present invention, it becomes possible to obtain the video count value used for the toner supply control and determine whether or not the high-density image portion exists in the image data by using the video counting processing for toner supply mounted with an existing hardware configuration.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-252060, filed Dec. 12, 2014, which is hereby incorporated by reference wherein in its entirety.

What is claimed is:

1. An image forming apparatus comprising a controller, including a processor configured to execute instructions stored in a memory, or including circuitry, the controller configured to:

in a case where a value of a pixel in image data is equal to or smaller than a predetermined value, convert the value of the pixel to a multiple of a constant k;

in a case where the value of the pixel is larger than the predetermined value, convert the value of the pixel to other than a multiple of the constant k;

count a sum of the converted values of pixels in the image data;

determine whether or not the image data includes at least one pixel whose value is larger than the predetermined value based on whether or not the counted sum is a multiple of the constant k; and control a printing unit to perform a pre-exposure process to expose an image carrier before charging the image carrier, based on the determination that the image data includes at least one pixel whose value is larger than the predetermined value.

2. The image forming apparatus according to claim 1, wherein, in a case where the counted sum is a multiple of the constant k, the controller is configured to determine that the image data does not include at least one pixel whose value is larger than the predetermined value.

3. The image forming apparatus according to claim 1, wherein, in a case where the counted sum is not a multiple of the constant k, the controller is configured to determine that the image data includes at least one pixel whose value is larger than the predetermined value.

4. The image forming apparatus according to claim 1, wherein the constant k is a prime number selected from among a plurality of prime numbers other than prime factors of a maximum value of the value of a pixel.

5. The image forming apparatus according to claim 1, wherein the constant k for at least a certain color component is different from another constant k for another color component.

6. The image forming apparatus according to claim 1, wherein the sum is counted for each color component, and wherein, in a case where there is a color component in which the counted sum is not a multiple of the constant k, it is determined that the image data includes at least one pixel whose value is larger than the predetermined value.

7. The image forming apparatus according to claim 1, wherein the constant k is the same for all the color components.

8. The image forming apparatus according to claim 1, wherein the sum is counted for each color component, and wherein, in a case where there are at least two color components in which the counted sum is not a multiple of the constant k, it is determined that the image data includes at least one pixel whose value is larger than the predetermined value.

9. The image forming apparatus according to claim 1, wherein the controller is further configured to perform the pre-exposure process on the image carrier for each color component in a case where the image data includes at least one pixel whose value is larger than the predetermined value.

10. The image forming apparatus according to claim 1, wherein the controller is further configured to execute instructions to:

count a sum of the converted values of pixels in the image data for each color component;

determine whether or not the image data includes at least one pixel whose value is larger than a predetermined value for at least one color component; and in a case where it is determined that the image data includes at least one pixel whose value is larger than the predetermined value for at least one color component, perform the pre-exposure process to expose the image carrier before charging the image carrier.

11. The image forming apparatus according to claim 1, wherein the controller is further configured to control toner supply based on the counted sum.

12. The image forming apparatus according to claim 1, wherein the controller is further configured to execute instructions to:

count a sum of the converted values of pixels in the image data for each color component; and determine whether or not the image data includes at least one pixel whose value is larger than a predetermined value for each color component.

13. An image forming method, comprising:

in a case where a value of a pixel in image data is equal to or smaller than a predetermined value, converting the value of the pixel to a multiple of a constant k;

in a case where the value of the pixel is larger than the predetermined value, converting the value of the pixel to other than a multiple of the constant k;

counting a sum of the converted values of pixels in the image data;

determining whether or not the image data includes a pixel whose value is larger than the predetermined value based on whether or not the counted sum is a multiple of the constant k; and performing a pre-exposure process to expose an image carrier before charging the image carrier, based on the determination that the image data includes at least one pixel whose value is larger than the predetermined value.

* * * * *